United States Patent

Christensen et al.

[15] 3,657,574

[45] Apr. 18, 1972

[54] TRANSISTOR CIRCUIT OPERATED IN SECOND BREAKDOWN MODE DRIVING A CAPACITIVE IMPEDANCE

[72] Inventors: Alton O. Christensen, Houston; Robert E. Brink, Friendswood, both of Tex.

[73] Assignee: Shell Oil Company, New York, N.Y.

[22] Filed: Feb. 3, 1970

[21] Appl. No.: 8,207

[52] U.S. Cl. .............................307/302, 307/202, 307/246, 307/254, 307/283

[51] Int. Cl. .......................................................H03k 17/60

[58] Field of Search..................307/246, 202, 254, 255, 263, 307/302, 283

[56] References Cited

UNITED STATES PATENTS

| | | | |
|---|---|---|---|
| 3,160,766 | 12/1964 | Reymond | 307/246 X |
| 3,506,844 | 4/1970 | Rohloff | 307/246 X |

OTHER PUBLICATIONS

Pub I. " Low Impedance Switch Circuit" by Gillett in IBM Tech Disclosure Bulletin, Vol 7, No. 6, Nov. 1964, page 440

Pub II " Reactive Omitter-Follower Logic Gate" by D' Agostino in RCA Technical Notes, TN No: 791, Sept. 25, 1968 pages 1 & 2

PUB III " Second Breakdown-A Comprehensive Review" by Schafft, in Proceedings of the IEEE, Vol 55, No 8, Aug. 1967 pages 1279 & 1280.

*Primary Examiner*—Stanley D. Miller, Jr.
*Attorney*—J. H. McCarthy and Theodore E. Bieber

[57] ABSTRACT

A method of and means for driving a capacitive impedance is disclosed in which a transistor is connected between a source of electrical energy and the capacitive impedance and biased to be triggered into conduction in its second breakdown mode. Methods of and means for limiting the energy passing through such transistor to a level below that required for destruction thereof are described.

12 Claims, 6 Drawing Figures

PATENTED APR 18 1972 3,657,574

INVENTOR.
ALTON O. CHRISTENSEN
BY
Mellin, Moore & Weissenberger
ATTORNEYS

TRANSISTOR CIRCUIT OPERATED IN SECOND BREAKDOWN MODE DRIVING A CAPACITIVE IMPEDANCE

BACKGROUND OF THE INVENTION

This invention relates to methods of and means for driving a capacitive impedance and more particularly to a method of and means for driving the capacitive reactance of the impedance present in electronic circuitry in order to selectively increase or decrease electrical potential differences between various components or elements of such circuitry or between such elements or components and ground.

In the operation of electronic circuits there is the requirement that capacitive components or elements representing a capacitive load be charged to a particular voltage level, held at that voltage level for a period of time and subsequently discharged in order to accomplish desired control or operational functions in the circuit. For example, potential differences must be established between the electrodes of electron discharge devices or between the junctions or layers or solid state devices in order for them to operate when desired and such potentials must be removed to terminate such operation. Since such electrodes, junctions or layers are insulated from each other, they present a capacitive impedance to the power supply or control circuit which is utilized to provide the required potential difference therebetween and such potential difference will tend to remain unless the impedance also includes resistive reactance. It is usually desirable that such charging or discharging take place as rapidly as possible to insure acceptable and efficient operation of the circuit involved. It is also often desirable to perform a charge-discharge cycle at high repetition rates and with a minimum of power consumption by the circuitry utilized for controlling the charge-discharge cycle.

It is an object of this invention to provide a method of and means for driving a larger amount of capacitance at a given voltage level and at a given repetition rate with a given power consumption than was possible according to the teaching of the prior art.

It is another object of this invention to provide a method of and means for charging or discharging a given amount of capacitance in a shorter period of time at a given voltage level, repetition rate, and power consumption than was possible according to the teaching of the prior art.

It is a further object of this invention to provide a method of and means for driving a given amount of capacitance at a given voltage level and a higher repetition rate with a given power consumption than was possible according to the teaching of the prior art.

It is yet another object of this invention to provide a method of and means for driving a given amount of capacitance at a higher voltage level and at a given repetition rate with a given power consumption than was possible according to the teaching of the prior art.

It is a still further object of this invention to provide a method of and means for driving a given capacitance at a given voltage level and a given repetition rate with less power consumption than was possible according to the teaching of the prior art.

For example, in the operation of arrays of insulated gate field effect transistors (IGFET's), clocking pulses having a frequency of the order of 10 megahertz are required to sequence the functions of the IGFET arrays. Such clocking signals must supply sufficient power to charge the insulated gates of the IGFET's as well as the circuit capacitances involved. Where the arrays are based on ratioless IGFET circuitry as disclosed and claimed in prior U.S. Pat. Application No. 787,067 filed Dec. 26, 1968, in the name of Alton O. Christensen, entitled Transistor Inverter Circuit, now U.S. Pat. No. 3,502,908, issued Mar. 24, 1970 and assigned to the same assignee as is this application, the amount of capacitance that must be charged by the clocking signal may be quite large. Clocking pulses capable of charging or discharging such circuitry in 20 nanoseconds at the 18-volt level and at charge/discharge repetition rates approaching 10 megahertz with a power dissipation of about 8 watts are required.

A typical IGFET memory array with integral ratioless decoders and capable of storing 512 bits, such as is conventionally formed by the deposition of metal oxides on a silicon chip to form metal oxide silicon field effect transistors (MOSFET's) with their conductive interconnections, possess an inherent capacitance of about 150 picofarads that must be charged and discharged by the clock pulses. According to the teaching of the prior art it is possible to generate clock pulses capable of charging or discharging up to 400 picofarads of capacitance at the 18-volt level in about 20 nanoseconds and at a charge/discharge repetition rate approaching 10 megahertz with a power consumption of about 8 watts. Thus, a maximum of two of such silicon chip memory arrays may be driven by a single clocking circuit according to the teaching of the prior art.

However, economic and reliability considerations make it desirable to provide a single clocking circuit capable of driving a minimum of eight of such silicon chip memory arrays or some 1,200 picofarads of capacitance at the voltage level, repetition rate and power consumption given above. The method and means of this invention has demonstrated the capability of driving about 2,500 picofarads at the 18-volt level with charge or discharge times of 15 nanoseconds, and at repetition rates of 10 megahertz with a power consumption of about 8 watts. Thus, this invention provides an increase of some six times in the capacitance it is capable of driving over the capacitance that may be driven according to the prior art and more than twice the minimum dictated by economic and reliability considerations. It will be understood that the capability of this invention may be utilized to meet requirements other than the driving of increased capacitance at a given voltage level, repetition rate and power consumption. For example, a given amount of capacitance could be driven to higher voltage levels at a given repetition rate and power consumption, or a given capacitance could be driven to a given voltage at a higher repetition rate for a given power consumption than would have been possible according to the teaching of the prior art. Embodiments of the method and means of this invention may also be used to drive electronic circuitry in which the impedance to be driven includes substantial resistive reactance as is encountered in driving bi-polar gates or high frequency transmission lines.

The above and other objects, features and advantages of the method and means of this invention will be more clearly apparent from the following description of preferred embodiments thereof when read in conjunction with the attached drawing wherein:

DESCRIPTION OF THE PREFERRED EMBODIMENTS

Figures 1, 2, 3, 4, 5, 6:
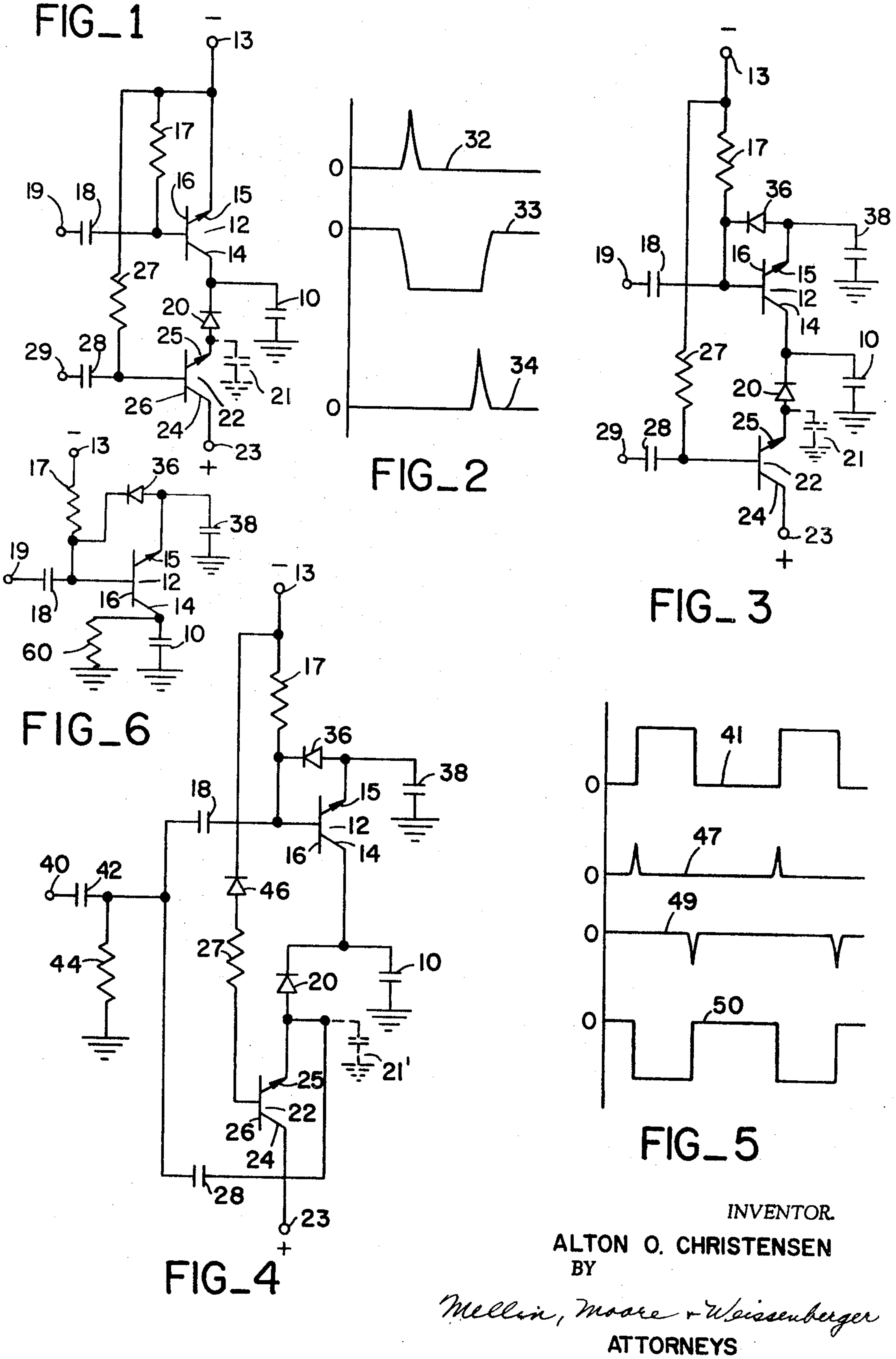
FIG. 1 is a schematic representation of one embodiment of this invention.
FIG. 2 is a graphical representation of the triggering and output voltage waveform associated with the operation of the embodiment of this invention shown in FIG. 1.
FIG. 3 is a schematic representation of a further embodiment of this invention capable of operation with the triggering voltage waveforms and producing the output voltage waveform shown in FIG. 2.
FIG. 4 is a schematic representation of another embodiment of his invention adapted to operate with a single triggering circuit input.
FIG. 5 is a graphical representation of the voltage waveforms associated with the operation of the embodiment of this invention shown in FIG. 4
FIG. 6 is a schematic representation of yet another embodiment of this invention adapted to drive a capacitive impedance having a substantial resistive component.

Referring to FIG. 1, one embodiment of the method and means of this invention is shown schematically. The capacitive impedance to be driven is represented at 10 as a capacitor having one of its leads connected to ground. It will be understood that such capacitive impedance 10 may be a complicated electronic circuit comprising a large number of discrete components together with the electrical conductors interconnecting them. A transistor 12 is shown connected between the other lead of the capacitor 10 and a voltage input 13. According to this embodiment of the invention the collector 14 of the transistor 12 is connected to the capacitance 10 and the emitter 15 of the transistor 12 is connected to the voltage input 13 in which case a source of negative voltage (not shown) is connected between the voltage input 13 and ground. The base 16 of transistor 12 is reverse biased by connecting it to the voltage input 13 through a resistor 17. Means for triggering the transistor 12 into conduction is provided including capacitor 18 connected between the base 16 of transistor 12 and a trigger input 19. A second transistor 22 is connected between a second voltage input 23 and the capacitor 10 by means of a diode 20. According to this embodiment of the invention a source of positive voltage (not shown) is connected between voltage input 23 and ground, the collector 24 of transistor 22 being connected to the second voltage input 23 and the emitter 25 of the transistor 22 being connected to the capacitor 10 through the diode 20. The second transistor 22 is also reverse biased by connecting the base 26 thereof to the voltage input 13 through a resistor 27. Means for triggering the second transistor 22 into conduction including a capacitor 28 connected between the base 26 thereof and a trigger voltage input means 29 are provided. The function of the diode 20 and its inherent capacitance 21 (indicated by dotted lines) is to prevent the discharging transistor 22 from being triggered into conduction by the charging circuit as will be more fully explained hereinafter.

According to this invention the transistors 12 and 22 are biased to be triggered into the "second breakdown" mode of conduction. Such second breakdown mode of conduction is to be distinguished from "avalanche" conduction and has received considerable attention and publication in the prior art as an undesirable effect to be avoided because it will result in the destruction of the transistor if uncontrolled. See for example "Second Breakdown — Comprehensive Review" by Harry A. Schafft "Proceedings of the IEEE," Vol. 55, No. 8, Aug. 1967.

Second breakdown in bi-polar transistors and junction diodes is believed to cause a constriction in the junction area through which the current flows. The constriction produces a change in the junction because of the associated high temperature at the constriction, and a mesoplasma is formed, reducing the normal conduction resistance by a factor of about 30 and allowing very high currents to flow through the transistor. During the breakdown a lateral current flows in the base emitter junction, producing a higher voltage at the current constriction than in the base area outside the constriction and an observable increase in the base emitter forward bias originally due to the trigger pulse. If the current flow through the transistor in the second breakdown mode is not limited, destruction of the transistor will result. According to the teachings of this invention such current flow is limited as disclosed herein so that destruction of the transistor is avoided.

This is not to say that the transistors normal characteristics are left unchanged. Instead a suitable transistor as described below will have its avalanche mode of conduction eliminated after initial operation in the controlled breakdown mode in accordance with this invention. Normal measurements on such a transistor will show that its gain has been reduced by a factor of 5 or so, predictably and stably, and that the transistor will abruptly go from non-conduction into the second breakdown mode of conduction as the supply voltage is increased.

The preferred transistor for use as transistor 12 or transistor 22 in embodiments of this invention are of the so-called "-stripe" geometry wherein rectangular base and emitter diffusions are interdigited. It is also preferred that the transistor have small dimensions between junctions, shallow diffusion and an epitaxial barrier of 1 or 2 microns thickness. The above listed physical characteristics all tend to enhance the current drive capability of the transistor and to increase the current conducted in the second breakdown mode of conduction. Bipolar transistors having the preferred characteristics given above are commercially available. Such transistors are classified as UHF oscillators such as are sold by Fairchild under type number SE3005. It will be understood that all bi-polar transistors and junction diodes are inherently subject to second breakdown modes of conduction at voltage levels which are customarily determined and specified for each particular type by the manufacturer thereof.

Thus according to the embodiment of this invention shown in FIG. 1 and depending on the transistor type used a source of negative voltage (not shown) at about 20 to 30 volts is connected between voltage input 13 and ground. A source of positive voltage (not shown) set at 5 to 10 volts is connected between voltage input 23 and ground. It will be seen that the bases 16 and 26 of transistors 12 and 22 will be reverse biased to a negative voltage of about 20 to 30 volts through the resistors 17 and 27 respectively and neither transistor will conduct. When a forward bias trigger pulse appears at voltage input 19 and is coupled through capacitor 18 to the base 16 of transistor 12, transistor 12 will be triggered into its second breakdown mode of conduction and the capacitance 10 will be charged to a value approaching the value of the negative voltage source at input 13. According to this embodiment of the invention the value of the capacitance 10 must be carefully selected and controlled so that the total energy required to be passed through transistor 12 will not be sufficient to destroy such transistor. As pointed out hereinabove some 2,500 picofarads of capacitance may be charged to a value of about 18 volts without destroying the transistor 12. Due to the extremely high currents which can be conducted by the transistor 12 in its second breakdown mode of conduction it has been found that the capacitance may be charged to such voltage in a time of about 15 nanoseconds. It will be understood that according to this embodiment of the invention the capacitance 10 must not include any substantial amount of resistive reactance since the presence of such resistive reactance would increase the amount of energy required to be passed by the transistor 12 in its second breakdown mode of conduction and would thus tend to increase the chance of destruction of such transistor.

In order to insure the full discharge of the capacitance 10 in a time substantially equal to the charging time for capacitance 10, a positive voltage is provided at input 23 and connected to the capacitance 10 through the discharging transistor 22 and the diode 20. It will be understood that prior to the initiation of the charging pulse on capacitance 10 there is no voltage across the transistor 22 and diode 20. Upon initiation of the charging pulse the transistor 22 would tend to be subjected to the full value of the charging pulse plus the value of the positive voltage present at input 23 but for the presence of diode 20. The diode 20 possesses a certain amount of inherent resistance and capacitance and in addition, the interconnection between the diode 20 and the transistor 22 possesses inherent capacitance to ground as represented by dotted lines 21. Thus the inherent resistance and capacitance of the diode 20 and the interconnection capacitance 21 will absorb some of the voltage of the charging pulse by voltage divider action with the capacitance of the transistor 22. Such voltage divider action is essential according to this invention in order to prevent the transistor 22 from being triggered into its second breakdown mode of conduction by the charging pulse. Proper selection of the diode 20 and design of the interconnection capacitance 21 will prevent the transistor 22 from being triggered into conduction during the charging pulse.

However, upon appearance of a forward bias trigger pulse at input 29 the transistor 22 will be triggered into its second breakdown mode of conduction and the voltage present on capacitance 10 will be discharged through the diode 20 and the transistor 22 to the positive source of potential connected to input 23. It will be understood that the diode 20 is selected for high current conduction in addition to inherent resistance and capacitance characteristics mentioned above in order to enable it to handle the high current values involved in the second breakdown mode of conduction of transistor 22. It has been found that most fast nanosecond type diodes, such as are sold by Fairchild under type number FD1000, may be used in embodiments of this invention. Such diodes are known to be capable of handling 100 milliamps average current and peak currents as high as 10 amperes. Thus the capacitance 10 may be discharged back to ground level in approximately 15 nanoseconds.

As shown in FIG. 2 the charging trigger pulse, represented by waveform 32, is a simple positive going spike which is developed across resistor 17 for application to the base 16 of transistor 12. The duration of the trigger pulse need only be slightly greater than the 15 nanosecond charging time for capacitance 10. The actual length of the trigger pulse is, of course, determined to some extent by the RC time constant of capacitance 18 and resistance 17. The height of the trigger pulse is determined by the voltage required to trigger the transistor 12 into its second breakdown mode of conduction as modified by RC time constant of the capacitance 18 and the resistance 17. As shown by the waveform 33 the capacitance 10 may be charged to a negative voltage of some 18 volts in about 15 nanoseconds where a source of negative voltage of some 20 to 30 volts is present at input 13. As the trigger pulse at input 19 returns toward zero the conduction of transistor 12 will cease and the capacitance 10 will remain charged until the occurrence of the discharge pulse as represented by waveform 34.

Upon appearance of the forward bias discharge pulse 34 at input 29 the discharge transistor 22 will be triggered into its second breakdown mode of conduction and will discharge the capacitance 10 through diode 20 to the source of positive voltage at input 23. The capacitance of the diode 20 and the capacitance 21 of the interconnection between the diode 20 and the transistor 22 will also be discharged. As described in connection with the charging pulse, the discharge pulse 34 will be coupled through capacitor 28 developed across resistor 27 and applied to the base 26 of the transistor 22. The height of the discharge pulse 34 is determined by the voltage required to trigger the transistor 22 into its second breakdown mode of conduction and the length of the pulse 34 is determined by the RC time constant of the capacitance 28 and the resistance 27. At this point it should be noted that the diode 20 not only prevents the transistor 22 from being triggered into conduction by the charging pulse but also prevents the charging transistor 12 from being triggered into conduction during the discharge of capacitance 10 by isolating the transistor 12 from the positive voltage at input 23.

In view of the extremely short time (i.e., 15 nanoseconds) required for the charge and discharge of the capacitance 10 the charge/discharge cycle may be carried on at extremely high rates. In other words the length of time that the capacitance 10 remains charged, as indicated by waveform 33 in FIG. 2, may be made very short and repeated at a very high rate as for example 10 megahertz. Thus it has been found that the embodiment of this invention shown in FIG. 1 may be operated at a charge/discharge cycle rate of 10 megahertz with a total power dissipation of only 8 watts due to the high conductance (i.e., low resistance) of the transistors 12 and 22 when operated in their second breakdown mode of conduction. It will be seen that the duty cycle may be increased without increasing the power dissipation since there is no power loss except during the 15-nanosecond charge and discharge times. Thus it will be seen that the embodiment of this invention shown in FIG. 1 is capable of charging a given amount of capacitance 10 to a given voltage in a shorter length of time or of discharging such capacitance from such voltage in a shorter length of time than was possible according to the teaching of the prior art due to the high conductance of transistors 12 and 22 when operated in their second breakdown mode of conductance. In addition, it is possible to charge a larger amount of capacitance to a given voltage in a given length of time or of charging a given amount of capacitance to a higher voltage in a given length of time than was possible according to the teaching of the prior art subject only to the limitation imposed by the amount of energy that can be passed through transistors 12 and 22 in their second breakdown mode of conductance without destroying such transistors.

Referring to FIG. 3 an embodiment of this invention is shown which is designed to insure that the high current capability of transistors 12 and 22 when operated in their second breakdown mode of conduction may be utilized without danger of destroying such transistors. According to this embodiment of the invention the emitter 15 of transistor 12 is connected to voltage input 13 through a diode 36 and resistor 17. In addition, a capacitor 38 is connected between the emitter 15 of transistor 12 and ground. The embodiment shown in FIG. 3 is otherwise identical in form and operation to the embodiment shown in FIG. 1. The function of diode 36 and the capacitor 38 is to limit the amount of energy that is available for passage through transistor 12 in its second breakdown mode of conduction. Thus during the interval between charging trigger pulses the capacitor 38 is charged to substantially the value of the negative voltage applied to input 13 through resistor 17 and diode 36. When the charging trigger pulse appears at input 19 it will be applied not only to the base 16 of transistor 12 but also to the diode 36. Thus at the same time that the transistor 12 is triggered into its second breakdown mode of conduction the diode 36 will be biased into non conduction by the trigger pulse thereby isolating the transistor 12 from the voltage at input 13. Thus all of the energy for charging the capacitance 10 through transistor 12 must be supplied by the capacitor 38. A capacitor capable of supplying any given amount of energy at a given voltage may be readily selected as is well known in the prior art. Thus the amount of energy available for charging the capacitance 10 may be limited independently of the electrical characteristics of the capacitive load 10 or any transients which might occur therein during operation. It will be seen that it is not necessary to provide for the protection of transistor 22 from excessive energy being supplied to it during its operation in the second breakdown mode of conduction since the only energy available will be the energy stored in the capacitive load 10. It is, of course, assumed that the energy handling capabilities of transistors 12 and 22 will be substantially equal.

Referring to FIG. 4 a further embodiment of this invention is shown which is adapted to be controlled by a single clock pulse at input 40 to both charge and discharge the capacitive load 10. According to this embodiment of the invention an RC differentiator comprising capacitor 42 and resistor 44 is utilized to provide a positive going trigger pulse upon initiation of the clock pulse at input 40 and a negative going trigger pulse upon termination of the clock pulse applied at input 40. The RC differentiator comprising capacitor 42 and resistor 44 is connected between the input 40 and the base 16 of transistor 12 through capacitor 18 and between the input 40 and the emitter 25 of transistor 22 through capacitor 28. As pointed out hereinabove the transistors 12 and 22 when biased as disclosed herein may be triggered into their second breakdown mode of conduction by an appropriate pulse on any one of their electrodes. Thus the application of a negative trigger pulse to the emitter 25 of transistor 22 will trigger it into its second breakdown mode of conductance as effectively as a positive going trigger pulse applied to its base 26. A diode 46 is connected between resistor 27 and voltage input 13 in order to further isolate transistors 12 and 22 from each other and insure that they will not be triggered into conduction by transients which may occur during operation. The embodiment of FIG. 4 is otherwise identical to the embodiment shown in FIG. 3 except for a further increase in the capacitance 21' inherent in the interconnection of diode 20 and transistor 22 which increase is inherent in the conductors required to couple the trigger pulse to the emitter 25 of transistor 22.

Thus referring to FIG. 5 the application of positive going clock pulses represented by waveform 41 to input 40 will be converted into positive going charge trigger pulses represented by waveform 47 and negative going discharge trigger pulses represented by waveform 49. As shown, positive going trigger pulses 47 will occur at the initiation of the positive going clock pulses 41, and the negative going discharge pulses 49 will occur when the positive going clock pulses 41 are terminated. The positive going trigger pulses 47 will be coupled both to the base 16 of transistor 12 through capacitor 18 and to the emitter 25 of transistor 22 through the capacitor 28. However, only transistor 12 will be triggered into its second breakdown mode of conduction by the positive going trigger pulses thus connecting the capacitive load 10 to the capacitor 38 and transferring energy from the capacitor 38 through the transistor 12 onto capacitive load 10. Similarly, the negative going discharge trigger pulses will be coupled both to the emitter 25 of transistor 22 and to the base 16 of transistor 12. However only transistor 22 will be triggered into its second breakdown mode of conduction by such negative going trigger pulses 49 thereby discharging the capacitive load 10 through diode 20 and transistor 22 to the source of positive potential connected to voltage input 23. The negative voltage charge and discharge of capacitive load 10 is represented in FIG. 5 by waveform 50.

Referring to FIG. 6 an embodiment of this invention suitable for use with a capacitive load 10 having a substantial resistive reactance as represented by the resistor 60 is shown. It will be understood that according to this embodiment of the invention there is no necessity to provide for the discharge of the capacitive load 10 since such discharge will take place through its resistive reactance 60. Thus the embodiment of this invention shown in FIG. 6 is identical to the embodiment of the invention shown in FIG. 3 with the exception that the discharging circuitry is omitted. It will be understood that it is essential that appropriate means be used to limit the amount of energy available for passage through the transistor 12 when it is triggered into its second breakdown mode of conduction if the resistive reactance 60 has a low enough value to enable it to conduct sufficient current to maintain the transistor 12 in its second breakdown mode of conductance for a sufficient time to destroy the transistor 12. The use of capacitor 38 and diode 36 will also insure that the operating frequency will be accurately controlled by the charging trigger pulses.

Although all of the embodiments shown in the drawing and described hereinabove have been based on the use of NPN-type transistors, as transistors 12 and 22, it will be understood that other conventional types may be used.

What is claimed is:

1. The method of driving an impedance having a substantial capacitive component comprising the steps of a. connecting a power source to said impedance through a bi-polar transistor with given conductivity-type connected for conduction of collector-emitter current in a given direction;

b. biasing said transistor to be triggered into its second breakdown mode of conduction;

c. triggering said transistor into its second breakdown mode of conduction;

d. limiting the energy transmitted in said second breakdown mode of conduction to a level less than that required for destruction of said transistor;

e. connecting a further bi-polar transistor across said impedance, the further transistor being of said given conductivity-type and being connected to conduct collector-emitter current in the direction opposite said given direction;

f. triggering said further transistor into its second breakdown mode of conduction to discharge said impedance; and g. interposing a diode between said further transistor and said impedance, the diode being connected for conduction of forward current in the same direction as said further capacitor.

2. The method of driving an impedance having a substantial capacitive component comprising the steps of a. connecting a power source to said impedance through a bi-polar transistor which is connected for conduction of forward current in a given direction;

b. biasing said transistor to be triggered into its second breakdown mode of conduction;

c. triggering said transistor into its second breakdown mode of conduction; and d. limiting the energy transmitted in said second breakdown mode of conduction to a level less than that required for destruction of said transistor;

said step of limiting the energy transmitted in said second breakdown mode including:

e. interposing a diode between said bi-polar transistor and said power source, the diode being connected for conduction of forward current in said given direction;

f. connecting a capacitor in parallel with said bi-polar transistor and said impedance; and g. biasing said diode into its non-conducting state when said bi-polar transistor is triggered into its second breakdown mode of conduction.

3. A circuit for driving an impedance having a substantial capacitive component and including a pair of leads, said circuit comprising:

a. a transistor having an emitter electrode, a collector electrode and a base;

b. means connecting one of said emitter electrode and said collector electrode to one of said leads of said impedance;

c. means for connecting a source of voltage adapted to cause said transistor to conduct in its second breakdown mode between the other of said emitter and collector electrodes and the other of said leads of said impedance;

d. means connected to said base of said transistor biasing said transistor into its non-conducting mode;

e. means for applying a triggering voltage to said transistor to trigger said transistor into conduction in its second breakdown mode;

f. a diode connected between said transistor and said source of voltage, the diode being connected to conduct forward current in the same direction as the base-emitter junction of the transistor;

g. a capacitor connected from the junction between said diode and said transistor to said other of said leads of said impedance; and h. means biasing said diode into its non-conducting state when said transistor is triggered into its second breakdown mode of conduction.

4. A circuit for driving an impedance as claimed in claim 3 comprising a. a further transistor having an emitter electrode, a collector electrode and a base, said further transistor being connected across said impedance with emitter and collector electrodes opposite to that of the first-mentioned transistor for conduction of current in the opposite direction;

b. means connected to said base of said further transistor biasing said further transistor into its non-conducting mode; and c. means for applying a triggering voltage to said further transistor to trigger said further transistor into conduction in its second breakdown mode.

5. A circuit for driving an impedance as claimed in claim 4 further comprising 1. a diode interposed between said further transistor and said impedance, such diode being connected for conduction of forward current in the same direction as the collector emitter circuit of said further transistor.

6. A circuit as claimed in claim 5 comprising a further source of voltage of opposite polarity from said source of voltage and connected between said further transistor and said other of said leads of said impedance.

7. A circuit for driving impedance as claimed in claim 5 wherein said means connected to said base of said transistor biasing said transistor to its non-conducting mode includes a resistor connected between said base and said source of voltage and wherein said means biasing said further transistor into its non-conducting mode includes a resistor connected between said base of said further transistor and said source of voltage.

8. A circuit for driving an impedance as claimed in claim 7 wherein said means for applying a trigger voltage to said transistor includes a capacitor connected to said base of said transistor and said means for applying a triggering voltage to said further transistor includes a capacitor connected to said base of said further transistor.

9. A circuit as claimed in claim 7 further comprising input means for a triggering voltage pulse including an RC discriminator network connected to said triggering voltage means; and wherein said means for applying a triggering voltage to said transistor comprises a capacitor connected between said RC discriminator and said base of said transistor and said means for applying a triggering voltage to said further transistor comprises a capacitor connected between said RC discriminator and one of said emitter and collector electrodes of said further transistor.

10. A circuit for driving an impedance as claimed in claim 9 wherein a diode is interposed between said source of voltage and said resistor connected to said base of said further transistor.

11. A circuit for driving an impedance having a substantial capacitive component and including a pair of leads, said circuit comprising:

a. a transistor having an emitter electrode, a collector electrode and a base;
b. means connecting one of said emitter electrode and said collector electrode to one of said leads of said impedance;
c. means for connecting a source of voltage adapted to cause said transistor to conduct in its second breakdown mode between the other of said emitter and collector electrodes and the other of said leads of said impedance;
d. means connected to said base of said transistor biasing said transistor into its non-conducting mode;
e. means for applying a triggering voltage to said transistor to trigger said transistor into conduction in its second breakdown mode;
f. limiting means connected in circuit with said impedance, said other of said emitter and collector electrodes and said source of voltage, for limiting the energy through the transistor in said second breakdown mode of conduction to a level less than that which is distructive to the transistor, the limiting means being inoperative during non-conduction of the transistor;
g. said means for applying a triggering voltage to said transistor, also applying an enabling signal to the limiting means to cause it to be operative upon triggering of the transistor.

12. A circuit according to claim 11 wherein the limiting means comprises a diode connected in series with the emitter and collector of the transistor poled for conduction in the same direction as the base-emitter junction, along with a capacitor connected between said other of the emitter and collector electrodes and said other of said leads.

* * * * *